United States Patent [19]
Dodgen

[11] Patent Number: 4,996,969
[45] Date of Patent: Mar. 5, 1991

[54] BARBECUE DEVICE AND BEVERAGE DISPENSER

[76] Inventor: John N. Dodgen, R.R. 2, Fort Dodge, Iowa 50501

[21] Appl. No.: 468,164

[22] Filed: Jan. 22, 1990

[51] Int. Cl.$^5$ .............................................. F24B 3/00
[52] U.S. Cl. .................................... 126/25 A; 126/25
[58] Field of Search ........................... 126/25 R, 25 A

[56] References Cited

U.S. PATENT DOCUMENTS

| | | | |
|---|---|---|---|
| 2,608,190 | 8/1952 | Winning et al. | 126/25 R |
| 3,696,803 | 10/1972 | Holloway | 126/25 R |
| 3,771,510 | 11/1973 | Short | 126/25 A |
| 4,567,876 | 2/1986 | Ogden | 126/25 R |
| 4,572,062 | 2/1986 | Widdowson | 126/25 A |

*Primary Examiner*—Carroll B. Dority
*Attorney, Agent, or Firm*—Zarley, McKee, Thomte, Voorhees & Sease

[57] ABSTRACT

This invention includes a trailer mounted barbecue and dispenser device. The barbecue device is mounted on a trailer deck and has a support means which supports a lower base compartment in which a fuel grill is mounted and on which a food grill is suspended. The fuel grill can be vertically adjustably positioned within the compartment. A cover means is pivotally secured to the lower base compartment by means of a friction hinge whereby the pivotal attitude of the cover is maintained in any pivotal position in which it is manually placed. The food grill on the lower base compartment can be pivoted upwardly about its lower edge to provide access to the fuel grill there below. The food grill has a plurality of small openings therein to permit fuel to be inserted therein at the pleasure of the operator. A duct extends downwardly from the lower base compartment through the deck of the trailer, and a damper is mounted therein. The damper serves to control the air flow upwardly through the device and outwardly through the partially opened cover. Also, the duct permits the residue from the burning material to be dropped downwardly through the duct and the trailer deck to a refuse receptacle. A beverage container is mounted on the trailer deck and has a cover pivotally secured thereto. The cover can be pivotally opened to a horizontal position and is supported in this position by a rod extending from the tongue of the trailer.

9 Claims, 3 Drawing Sheets

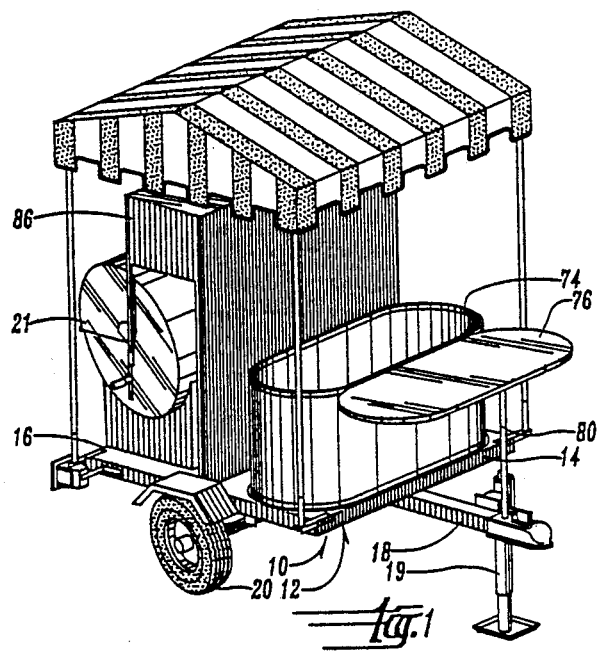
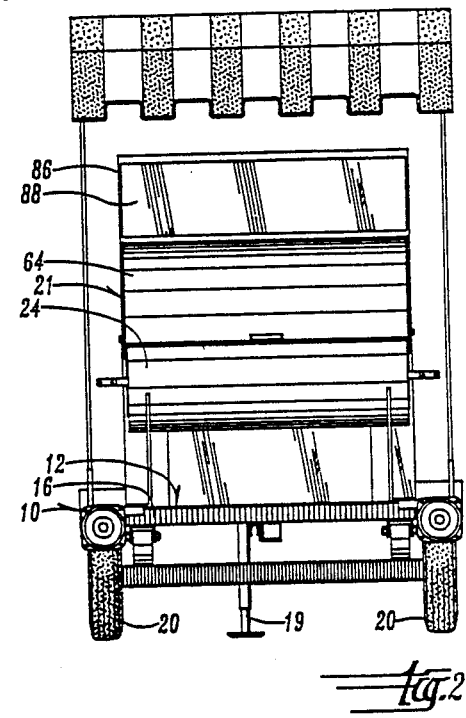
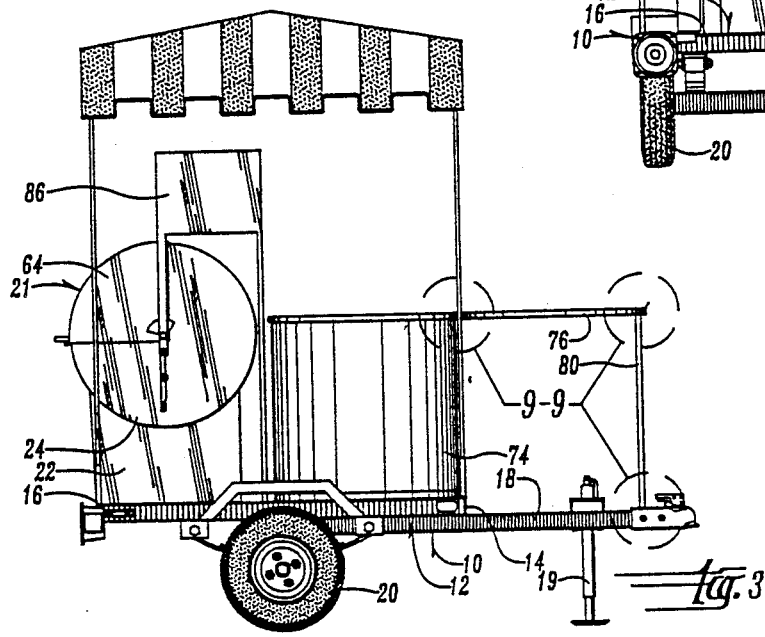

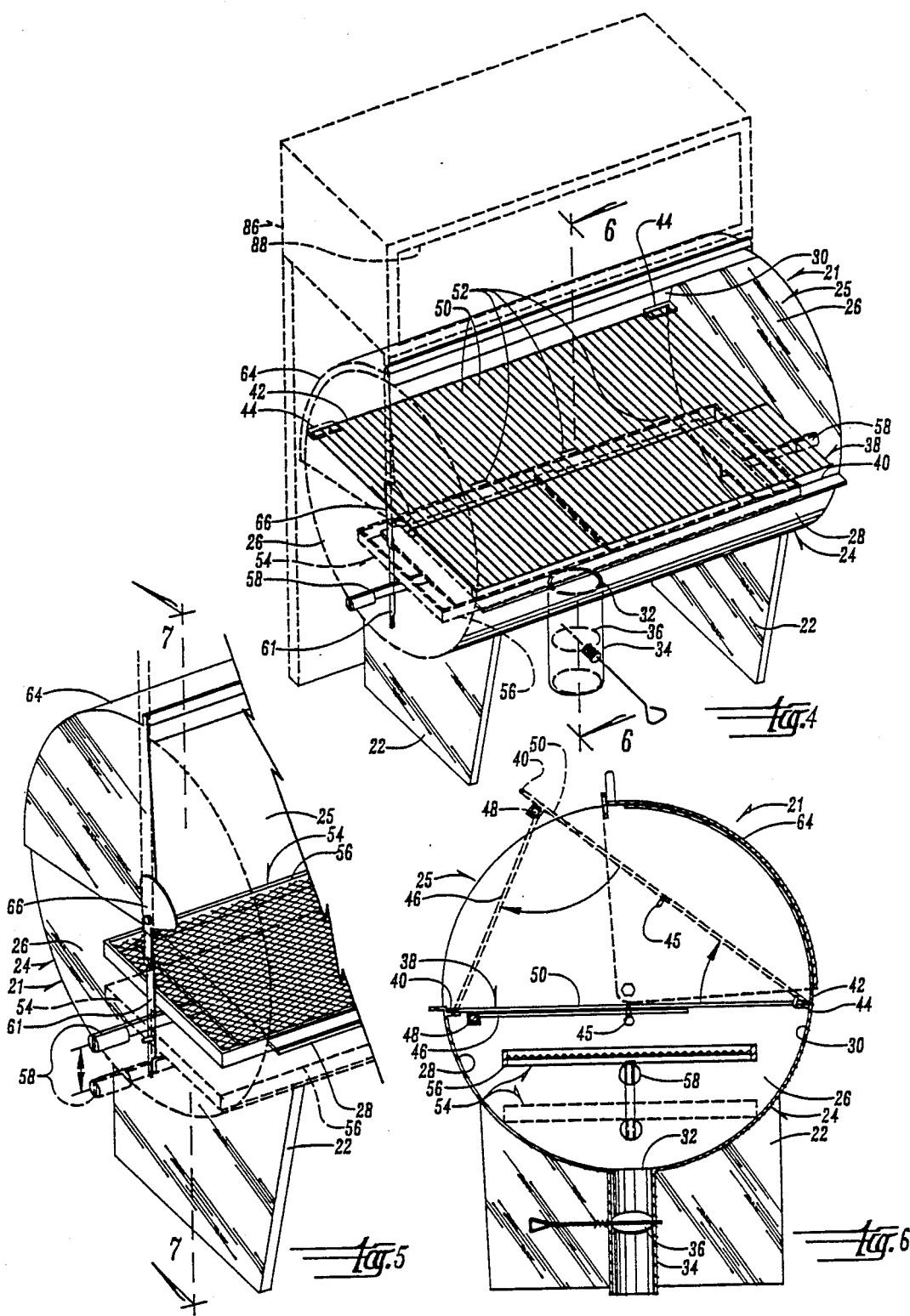

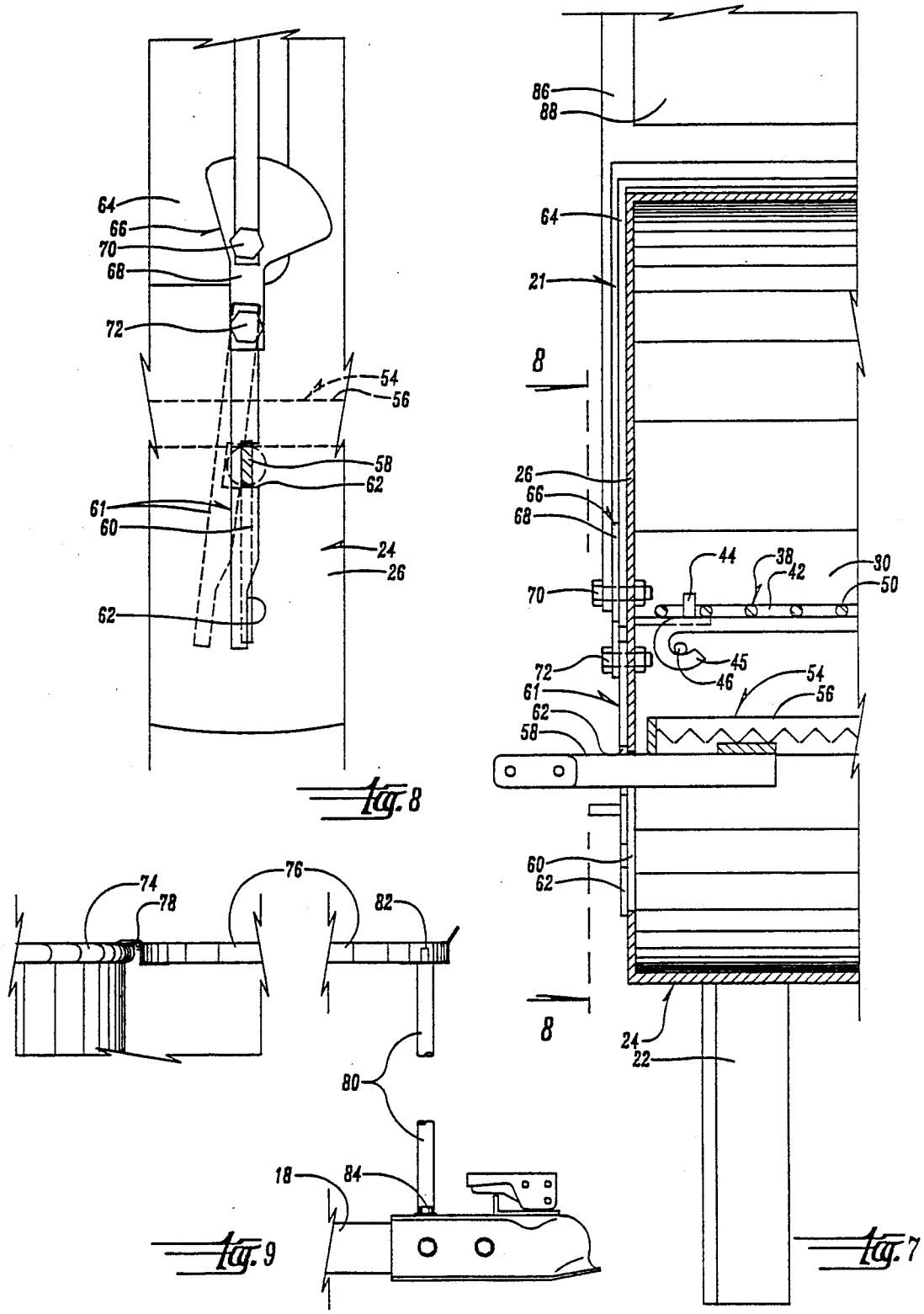

BARBECUE DEVICE AND BEVERAGE DISPENSER

BACKGROUND OF THE INVENTION

Barbecue devices for both home and commercial operations often create difficulties in the adjustment of air flow for the combustible materials. Further, they are difficult to clean and usually make the salvage of non-combusted material difficult if not impossible. Portable commercial barbecues usually do not have facilities to dispense beverages and the like which limits the utility thereof.

It is therefore a principal object of this invention to provide a barbecue device which can infinitely control the airflow therethrough whereby the combustion of the materials therein can be controlled as well as the temperature within the device.

A further object of this invention is to provide a barbecue device with a cover wherein the cover has a pivotal brake hinge which will permit it to stay in any attitude in which it is manually moved.

A still further object of this invention is to provide a barbecue device which has a fuel grill that can be easily raised and lowered and which can have one end raised or lowered with respect to the other end if desired.

A still further object of this invention is to provide a barbecue device wherein the residue of combustible materials can be easily removed from the burning area.

A still further object of this invention is to provide a barbecue device which has a food grill with openings therein which are adapted to receive combustible material.

A still further object of this invention is to provide a trailer mounted barbecue device equipped with a beverage dispenser having a cover thereon which can be pivoted to a horizontal position to serve as a utility table.

These and other objects will be apparent to those skilled in the art.

BRIEF SUMMARY OF THE INVENTION

This invention includes a trailer mounted barbecue and dispenser device. The barbecue device is mounted on a trailer deck and has a support means which supports a lower base compartment in which a fuel grill is mounted and on which a food grill is suspended. The fuel grill can be vertically adjustably positioned within the compartment.

A cover means is pivotally secured to the lower base compartment by means of a friction hinge whereby the pivotal attitude of the cover is maintained in any pivotal position in which it is manually placed.

The food grill on the lower base compartment can be pivoted upwardly about its lower edge to provide access to the fuel grill there below. The food grill has a plurality of small openings therein to permit fuel to be inserted therein at the pleasure of the operator.

A duct extends downwardly from the lower base compartment through the deck of the trailer, and a damper is mounted therein. The damper serves to control the air flow upwardly through the device and outwardly through the partially opened cover. Also, the duct permits the residue from the burning material to be dropped downwardly through the duct and the trailer deck to a refuse receptacle.

A beverage container is mounted on the trailer deck and has a cover pivotally secured thereto. The cover can be pivotally opened to a horizontal position and is supported in this position by a rod extending from the tongue of the trailer.

BRIEF DESCRIPTION OF THE DRAWINGS

FIG. 1 is a perspective view of the device of this invention;

FIG. 2 is a rearward elevation thereof;

FIG. 3 is a typical side elevational view thereof;

FIG. 4 is an enlarged scale perspective view of the barbecue device of this invention;

FIG. 5 is an enlarged partial perspective view of the left hand end of the device of FIG. 4;

FIG. 6 is a sectional view taken on line 6—6 of FIG. 4;

FIG. 7 is an enlarged scale sectional view taken on line 7—7 of FIG. 5;

FIG. 8 is a partial elevational view taken on line 8—8 of FIG. 7; and

FIG. 9 is a composite elevational view at an enlarged scale taken on lines 9—9 of FIG. 3.

DESCRIPTION OF THE PREFERRED EMBODIMENT

The numeral 10 designates a trailer having a deck 12 with a forward end 14 and rearward end 16. A tongue 18 extends forwardly from forward end 14 and has a conventional retractable jack 19 secured thereto. Conventional wheels 20 support the trailer deck 12.

The barbecue structure 21 has a support frame 22 which supports a cylindrical lower base compartment 24. One quadrant of compartment 24 is removed to provide an access opening 25 (FIG. 6). The lower base compartment has opposite ends 26 (FIG. 4), a front edge 28 and a rearward edge 30. An opening 32 appears in the center bottom of the compartment 24. Duct 32 extends downwardly therethrough and extends through a suitable opening in trailer deck 12. A conventional damper 36 is mounted within duct 34 at a position above trailer deck 12.

A food grill 38 is mounted in a horizontal position on compartment 24 and extends from front edge 28 to rear edge 30. The food grill 38 has forward edge 40 and rearward edge 42. A hinge 44 (FIG. 7) engages a hook 45 secured to compartment 24 so that the rearward edge is pivotally mounted. An arm 46 (FIG. 6) is pivotally secured to food grill 38 adjacent its forward edge 40 and is adapted to be pivoted from a position of alignment with food grill 38 to the support position shown in FIG. 6 so that the food grill can be selectively held in an inclined position at times to permit the operator to have access to the inside of compartment 24.

The food grill 38 is comprised of a plurality of rods 50 which are discontinued at selected positions to create openings 52 therein. The openings 52 permit the operator to selectively add combustible materials to the device at times without having to pivot the food grill into the inclined position shown in FIG. 6.

A fuel grill 54 is mounted within the compartment 24, and includes a rigid frame 56 which has rigid arms 58 extending outwardly from each end thereof through vertical slots 60 in compartment 24. As shown in FIG. 8, arm 61 is pivotally supported at its upper end by retainer pin 72 (described below). Arms 61 have notches 62 to support arms 58 in an upper position, but can be swung aside to permit arms 58 to rest in the bottom of slots 60. Arms 61 also serve to cover slots 60 to prevent an air draft therethrough. This arrangement of structure permits the fuel grill to be raised and lowered to different elevations. It also permits one end to be raised or lowered with respect to the other end to satisfy certain cooking requirements.

A cover 64 is cylindrical in shape and complementary to the shape of compartment 24. Cover 64 is pivotally secured to compartment 24 by means of friction hinge 66. Hinge 66 includes a friction flange 68 (FIG. 8). A pivot pin 70 pivotally secures the cover to the compartment 24. A retainer pin 72 secures the friction flange 68 to the compartment 24. Pin 70 holds the cover in frictional engagement with flange 68 so that regardless of the pivotal position to which cover 64 is moved with respect to compartment 24, the friction between flange 68 and the cover will maintain the cover in the angular position to which it is moved.

A beverage container 74 is mounted on trailer deck 12 and has a cover 76 secured thereto by hinge 78 (FIG. 9). When the beverage container is in its service mode, the cover 76 is opened and moved to the horizontal position shown in FIG. 1. A rod 80 has a detent 82 which engages the cover 76 at its upper end, and the hollow structure of rod 82 engages nut 84 on tongue 18 to maintain the opened cover 76 in the horizontal position shown in FIGS. 1 and 3.

A warming oven 86 is mounted above the barbecue 21 and has a suitable storage compartment 88 in which various cooked articles can be placed and maintained at an eating temperature.

In normal operation, the food grill 38 is raised to the elevated position shown in FIG. 6, and fuel, such as charcoal or the like, is placed on fuel grill 54. The damper 36 is moved to any desired position, and the cover 64 is moved to a lowered condition (normally slightly opened) after the grill 38 has been lowered to its original horizontal position. As indicated heretofore, the cover 64 will remain in whatever opened position to which it has been manually moved by reason of the friction hinge 66.

The fuel grill 54 can be raised by grasping the arms 58 and moving the arms from the bottom of slot 60 to notch 62 in arm 61 (FIG. 8). Under some conditions, it will be desirable to have one end of the grill higher than the other if more or less heat is needed under certain portions of the food grill 38. If additional fuel material, or flavoring material, such as hickory chips or the like, are needed during the cooking operation, they can be inserted through openings 52 in the food grill 38 without having to raise the food grill to the upper pivotal position of FIG. 6.

When the cooking operation has been completed, the damper 36 can be opened, the food grill 38 raised, and the residue of the combustible materials can be manually moved to exit the compartment 24 through the duct 34 with the damper 36 being in an open position. Since the duct 34 extends through the trailer deck, it is very easy to place a refuse container underneath the deck to receive all of the residue material. Cleaning is therefore greatly facilitated.

The pivotal cover 76 on beverage container 74 provides a very useful table surface when moved to the horizontal position shown in FIGS. 1 and 3. When serving is completed, the rod 80 can be removed, whereupon the cover 76 is pivoted back to its closed position on beverage container 74.

Thus, from the foregoing, it is seen that the device of this invention will achieve at least all of its stated objectives.

I claim:

1. A barbecue device, comprising,
   a support means,
   a lower base compartment means on said support means,
   a fuel grill means having opposite ends mounted within said lower base compartment means,
   lifting means connecting said grill means and said base compartment means to permit each end of said grill means to be raised or lowered independent of the other of said ends,
   a food grill means mounted on said lower base compartment means, said food grill means having forward and rearward edges,
   hinge means connecting said rearward edge of said food grill means to said lower base compartment means, and
   arm means movably connected to said food grill means to support said forward edge of said food grill means in an elevated position with respect to said rearward edge thereof to permit access to fuel said grill means in said lower base compartment means.

2. The device of claim 1 wherein said lifting means comprises elongated arms secured to the opposite edges of said fuel grill means and extending outwardly through slot openings in said lower base compartment means, and notch means to support said arms at different elevations.

3. The device of claim 1 wherein said food grill means is comprised of a plurality of spaced elongated rods, with short segments of some rods being discontinued to create access openings in said food grill means for the introduction of burning material through said food grill means into said lower base compartment means.

4. A barbecue device, comprising,
   a support means,
   a lower base compartment means on said support means,
   a fuel grill means having opposite ends mounted within said lower base compartment means,
   lifting means connecting said grill means and said base compartment means to permit each end of said grill means to be raised or lowered independent of the other of said ends,
   said lower base compartment means having an opening in the bottom portion thereof,
   a duct extending downwardly from said opening,
   damper means in said duct to control the flow of air therethrough,
   said support means includes a trailer deck with said duct extending downwardly through said deck to permit residue from said burning material to be moved downwardly through said duct to a location below said trailer deck.

5. A barbecue device, comprising,
   a support means,
   a lower base compartment means on said support means,
   a fuel grill means having opposite ends mounted within said lower base compartment means,
   lifting means connecting said grill means and said base compartment means to permit each end of said grill means to be raised or lowered independent of the other of said ends, said support means including a wheel mounted trailer deck having forward and rearward ends, and a forwardly extending tongue, said barbecue device being mounted on the rearward end of said trailer deck, a beverage container on the forward end of said deck, a cover on said container and pivotally connected thereto to be pivoted upwardly and thence outwardly over said tongue to function as a horizontal table means, and a support rod detachably secured to said tongue and extending upwardly to engage and support said cover in a horizontal position.

6. A barbecue device, comprising, a support means, a lower base compartment means on said support means, a fuel grill means having opposite ends mounted within said lower base compartment means, said lower base compartment means having an opening in the bottom portion thereof, a duct extending downwardly from said opening, damper means in said duct to control the flow of air therethrough, said support means includes a trailer deck with said duct extending downwardly through said deck to permit residue from said burning material to be moved downwardly through said duct to a location below said trailer deck.

7. A barbecue device, comprising, a support means, a lower base compartment means on said support means, a fuel grill means having opposite ends mounted within said lower base compartment means, said support means including a wheel mounted trailer deck having forward and rearward ends, and a forwardly extending tongue, said barbecue device being mounted on the rearward end of said trailer deck, a beverage container on the forward end of said deck, a cover on said container and pivotally connected thereto to be pivoted upwardly and thence outwardly over said tongue to function as a horizontal table means, and a support rod detachably secured to said tongue and extending upwardly to engage and support said cover in a horizontal position.

8. A barbecue device, comprising, a support means, a lower base compartment means on said support means, a fuel grill means having opposite ends mounted within said lower base compartment means, lifting means connecting said grill means and said base compartment means to permit each end of said grill means to be raised or lowered independent of the other of said ends, a cover means connected by hinge means to said lower base compartment means; said hinge means having friction components which will hold frictionally said cover means in a plurality of different positions of openness with respect to said lower base compartment means to permit variations of air control within said lower base compartment means to regulate the combustion of burning material therein.

9. A barbecue device, comprising, a support means, a lower base compartment means on said support means, a fuel grill means having opposite ends mounted within said lower base compartment means, a cover means connected by hinge means to said lower base compartment means; said hinge means having friction components which will hold frictionally said cover means in a plurality of different positions of openness with respect to said lower base compartment means to permit variations of air control within said lower base compartment means to regulate the combustion of burning material therein.

* * * * *